(12) United States Patent
Styles

(10) Patent No.: US 10,580,319 B2
(45) Date of Patent: Mar. 3, 2020

(54) INTERACTIVE MULTIMEDIA STORY CREATION APPLICATION

(71) Applicant: Creative Styles LLC, Minneapolis, MN (US)

(72) Inventor: Nicholas Colin Styles, St. Paul, MN (US)

(73) Assignee: Creative Styles LLC, Minneapolis, MN (US)

( * ) Notice: Subject to any disclaimer, the term of this patent is extended or adjusted under 35 U.S.C. 154(b) by 199 days.

(21) Appl. No.: 15/395,827

(22) Filed: Dec. 30, 2016

(65) Prior Publication Data

US 2017/0337841 A1    Nov. 23, 2017

Related U.S. Application Data

(60) Provisional application No. 62/339,415, filed on May 20, 2016.

(51) Int. Cl.
| | |
|---|---|
| A63F 13/79 | (2014.01) |
| G09B 17/00 | (2006.01) |
| A63F 13/80 | (2014.01) |
| A63F 13/798 | (2014.01) |
| G09B 5/06 | (2006.01) |
| G09B 7/00 | (2006.01) |
| A63F 13/792 | (2014.01) |
| A63F 13/73 | (2014.01) |

(52) U.S. Cl.
CPC ............ *G09B 17/006* (2013.01); *A63F 13/73* (2014.09); *A63F 13/79* (2014.09); *A63F 13/792* (2014.09); *A63F 13/798* (2014.09); *A63F 13/80* (2014.09); *G09B 5/065* (2013.01); *G09B 7/00* (2013.01); *A63F 2300/8064* (2013.01)

(58) Field of Classification Search
CPC ........ G09B 17/006; A63F 13/73; A63F 13/79; A63F 13/792; A63F 13/798; A63F 13/80; A63F 2300/8064
USPC .......................................................... 434/169
See application file for complete search history.

(56) References Cited

U.S. PATENT DOCUMENTS

| | | | |
|---|---|---|---|
| 2004/0205515 A1* | 10/2004 | Socolow | G06F 16/00 715/202 |
| 2005/0069849 A1* | 3/2005 | McKinney | G09B 17/00 434/178 |

(Continued)

OTHER PUBLICATIONS

"MeeGenius", https://www.meegenius.com, accessed Dec. 30, 2016, 3 pages total.

(Continued)

*Primary Examiner* — David L Lewis
*Assistant Examiner* — Shauna-Kay Hall
(74) *Attorney, Agent, or Firm* — Merchant & Gould P.C.

(57) ABSTRACT

A software application for teaching literacy through customized stories with gamification elements. Existing or new stories are created and customized for particular audiences and include text, animations, images, and sounds to produce an interactive multimedia story for presentation on a computing device with a display and audio output. Reading comprehension questions and games are provided to accompany the stories and the reader of the stories can earn rewards based on performance. The reader's performance is analyzed and reported to track progress.

19 Claims, 15 Drawing Sheets

(56) References Cited

U.S. PATENT DOCUMENTS

| | | | |
|---|---|---|---|
| 2005/0174777 A1* | 8/2005 | Cooper | F21V 23/0442 362/276 |
| 2007/0011607 A1* | 1/2007 | Lazareck | G06F 17/248 715/201 |
| 2007/0172798 A1* | 7/2007 | Thomas | G09B 19/00 434/128 |
| 2007/0202484 A1* | 8/2007 | Toombs | G09B 7/00 434/350 |
| 2007/0256011 A1* | 11/2007 | Jones | G06F 16/9535 |
| 2008/0140413 A1* | 6/2008 | Millman | G09B 7/02 704/270 |
| 2008/0256066 A1* | 10/2008 | Zuckerman | G06F 17/24 |
| 2008/0306995 A1* | 12/2008 | Newell | G11B 27/034 |
| 2010/0092930 A1* | 4/2010 | Fletcher | G09B 5/062 434/178 |
| 2010/0293037 A1* | 11/2010 | DeVincent | G06Q 10/10 705/300 |
| 2011/0107217 A1* | 5/2011 | Schwarz | G09B 5/062 715/716 |
| 2012/0156668 A1* | 6/2012 | Zelin | G09B 5/12 434/362 |
| 2012/0246562 A1* | 9/2012 | Maness | G06F 17/2229 715/256 |
| 2012/0316952 A1* | 12/2012 | Huang | G06Q 30/0241 705/14.39 |
| 2013/0145240 A1* | 6/2013 | Anderson | G06F 3/0483 715/201 |

OTHER PUBLICATIONS

"MeeGenius children's books: storybook + songbooks with interactive read along narration for kids," iTunes Preview, Jun. 30, 2016, 3 pages total.
"Speakaboos", https://www.speakaboos.com, accessed Dec. 30, 2016, 5 pages total.
"Speakaboos reading app: stories & songs for kids," iTunes Preview, Dec. 5, 2016, 3 pages total.
"PlayTales", http://www.playtales.com/en/home, accessed Dec. 30, 2016, 2 pages total.
"PlayTales! Kids' books," iTunes Preview, Sep. 28, 2013, 2 pages total.
"StoryToys", http://storytoys.com/, accessed Dec. 30, 2016, 8 pages total.
"Kid in Story", http://enuma.com/products-kidinstory/, accessed Dec. 30, 2016, 3 pages total.
"Kid in story book maker: create and share personalized photo storybooks," iTunes Preview, Sep. 4, 2015, 3 pages total.
"Reading Rainbow", https://www.readingrainbow.com/, accessed Dec. 30, 2016, 3 pages total.
"Reading Rainbow Skybrary Family", iTunes Preview, Nov. 14, 2016, 3 pages total.

* cited by examiner

INTERACTIVE MULTIMEDIA STORY CREATION APPLICATION

CROSS REFERENCE TO RELATED APPLICATIONS

This application claims benefit to U.S. Provisional Application Ser. No. 62/339,415 filed May 20, 2016, the entire disclosure of which is incorporated herein by reference.

BACKGROUND

Electronic books have grown in popularity due to their portability and capability to store numerous digital copies of books and other reading materials. In addition to devices that are dedicated to reading digital text, software applications have been developed for use on personal computing devices including portable devices like tablets and smart phones. The allure of electronic books extends to children, where the use of computing devices can provide interesting additional features to the text of a book, such as graphics, audio, animation, and even video. Numerous reading software applications have been developed to provide electronic books to children in ways that make reading entertaining.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

According to an embodiment, a literacy teaching method implemented on an electronic computing device comprises creating a customized story based on input from a teaching user, the input determining one or more of an audience, language, a setting, a series of plot segments, and one or more characters for the customized story; coordinating text, animations, and audio to match the determined audience, language, setting, plot segments, and characters; and generating reading comprehension games based on the customized story.

In another embodiment, one or more computer-readable media having computer-executable instructions embodied thereon are provided that, when executed by one or more computing devices, cause the device to establish an account for a teaching user by receiving input of the teaching user's name and recording speech of the teaching user for voice authentication; establish an account for a learning user by receiving input of the learning user's name and age and recording speech of the learning user for voice authentication; create a customized story based on input from the teaching user, wherein the input determines one or more of an audience, a setting, a series of plots segments, and one or more characters for the customized story, wherein the audience is specified by one or more of an age, a gender, and a reading level; coordinate text, animations, and audio to match the determined audience, setting, plot segments, and characters; generate reading comprehension games based on the customized story; play the animated story through a display and one or more speakers of the electronic computing device; receive audio input from a learning user or a teaching user reading the story aloud; authenticate the identity of the learning user or the teaching user reading the story aloud by matching the audio input with recorded speech of the user's account; present the reading comprehension games to the learning user; reward the learning user with badges, points, coins, or tokens based on the learning user's responses to the reading comprehension games; and analyze and report the learning user's performance on one or more of reading comprehension, pronunciation, reading speed, estimated reading level, and reading volume.

In yet another embodiment, a system is programmed to customize gamified multimedia stories. That system comprises a processor; a display; audio input; audio output; and system memory encoding instructions that, when executed by the processor, create: a user account module programmed to build user profiles and authenticate users; a story analysis module programmed to dissect stories into components and determine an appropriate audience for the stories; a multimedia coordination module programmed to sync story text, animations, background images, sounds, and narrations; a gamification module programmed to generate reading comprehension questions and provide rewards; a sharing module programmed to connect with other users; a performance analysis module programmed to monitor, analyze, and report user performance; a customization module comprising: a character module programmed to build and customize characters and avatars; a plot module programmed to build and customize plots of a story; a setting module programmed to build and customize settings; a language module programmed to modify the language of the story; and a narration module programmed to record and play narrations.

BRIEF DESCRIPTION OF THE DRAWINGS

Non-limiting and non-exhaustive examples are described with reference to the following figures.

DETAILED DESCRIPTION

Figure 1:
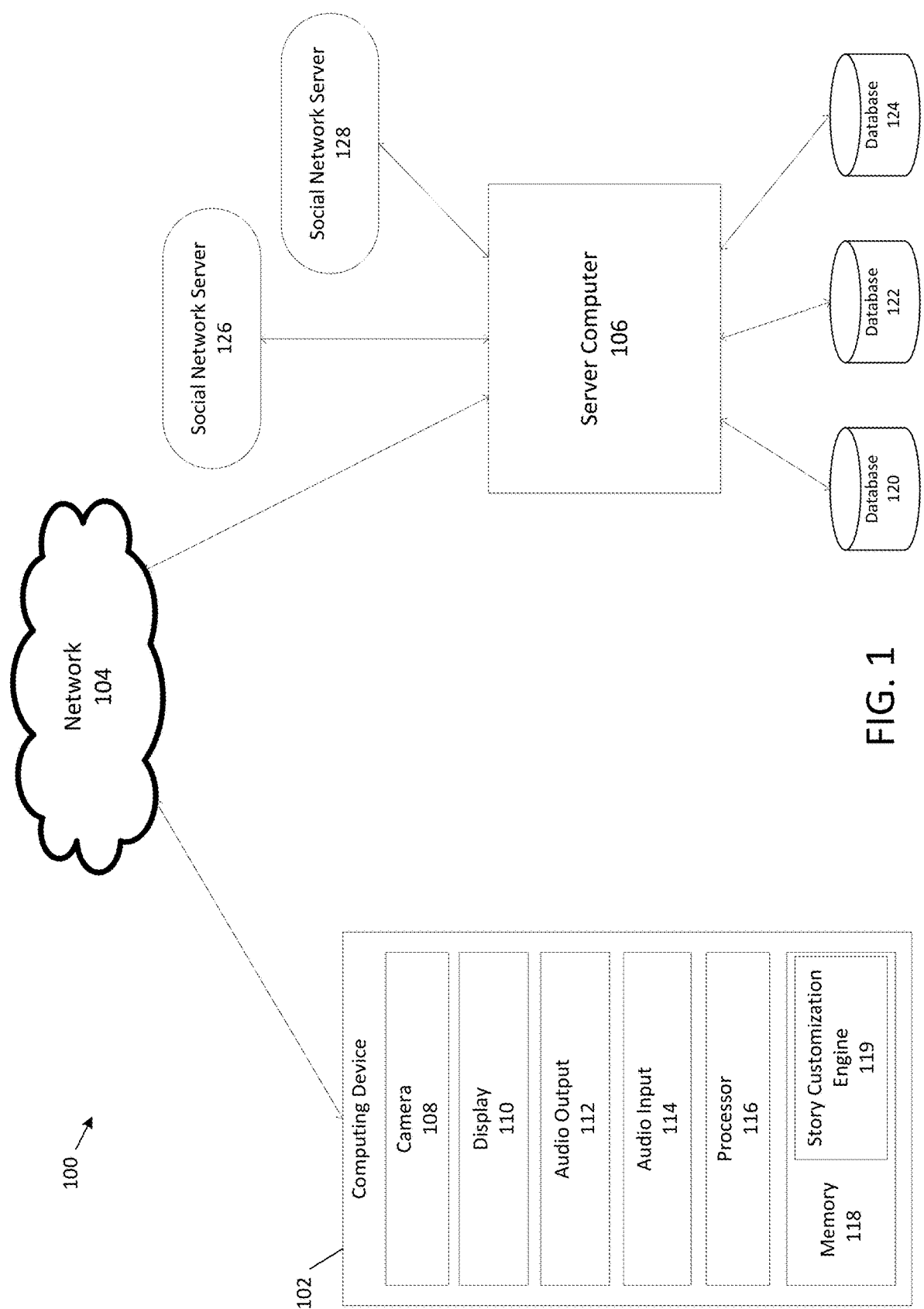
FIG. 1 shows an example system for creating multimedia stories implemented on a computing device.

Embodiments of the disclosure are directed to methods and systems of teaching literacy through customized multimedia stories presented on a computing device. In particular, a customizable interactive software application is provided which allows users to craft educational and exciting stories with personalized characters and themes portrayed exactly as the user desires. This allows users to construct characters that they can relate to, empowering them to create heroes that look themselves, thus contributing to self-esteem and self-worth of the user. The application allows the freedom to use characters built from family photos, characters from popular children's television shows and movies, as well as stock characters that can be modified by the user. Stories can also be customized to provide scenes and settings that are familiar to the user, teach particular lessons through stories, and even modify the language of stories to match the user's reading level and cultural heritage. Other features of the application are described in further detail in the following detailed description, which refers to the accompanying drawings.

Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

The aspects and functionalities described herein may operate via a multitude of computing systems including, without limitation, desktop computer systems, wired and wireless computing systems, mobile computing systems (e.g., mobile telephones, e-readers, netbooks, tablet or slate type computers, notebook computers, and laptop computers), hand-held devices, multiprocessor systems, microprocessor-based or programmable consumer electronics, mini-computers, and mainframe computers. The software application may also be utilized with augmented reality (AR) or virtual reality (VR) devices.

FIG. 1 illustrates an example system 100 for creating customized multimedia stories. The example system 100 includes a computing device 102, a network 104, and a server computer 106.

The example computing device 102 includes a camera 108, a display 110, audio output 112, audio input 114, a processor 116, and memory 118. The display 110 is a visual display such as a screen that is built-in to the computing device 102. According to an aspect, the computing device 102 has one or more input device(s) such as a keyboard, a mouse, a pen, a touch input device, etc. The output device(s) such as a printer, etc. are also included according to an aspect. The computing device 102 may have wireless capability. The wireless capability may include Bluetooth, Wi-Fi, radio frequency identification (RFID) or similar types of wireless capability. System memory 118 includes computer readable instructions that may include computer readable storage media and computer readable communication media.

The computing device 102 communicates with a network 104 that, in turn, communicates with a server computer 106. The network 104 may be a wireless "cloud network" which the computing device 102 communicates with via the processor 116. The computing device 102, network 104, and server 106 may be connected in other ways, such as a hard wired connection. Although alternatives are possible, the server computer 106 is typically associated with one or more databases 120, 122, 124 and one or more social network servers 126, 128.

According to an aspect, depending on the configuration and type of computing device, the system memory 118 comprises, but is not limited to, volatile storage (e.g., random access memory), non-volatile storage (e.g., read-only memory), flash memory, or any combination of such memories. According to an aspect, the system memory 118 includes one or more program modules suitable for running software applications such as the story customization engine 119 shown in FIG. 1. As stated above, according to an aspect, a number of program modules and data files are stored in the system memory 118. While executing on the processor 116, the program modules depicted in FIG. 2 perform processes including, but not limited to, one or more of the stages of the method 1400 illustrated in FIG. 14.

Figure 2:
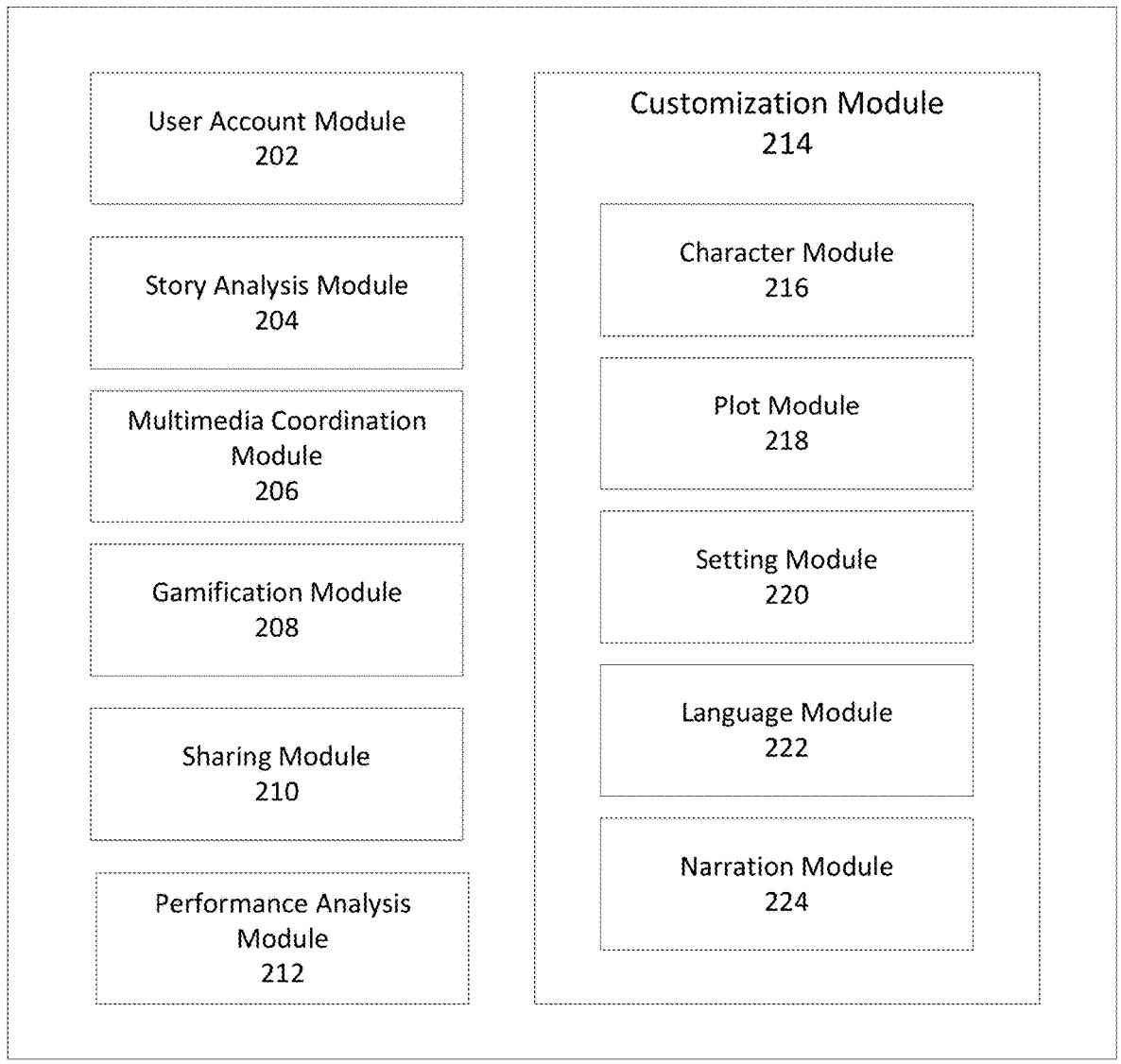
FIG. 2 shows example modules of the story customization engine of FIG. 1.

FIG. 2 shows a schematic block diagram of example modules of the story customization engine 119 that are created when the processor 110 executes instructions stored in the memory 112 of the computing device 102 of FIG. 1. Example modules include a user account module 202, a story analysis module 204, a multimedia coordination module 206, a gamification module 208, a sharing module 210, a performance analysis module 212, and a customization module 214.

The user account module 202 is programmed to build user profiles and authenticate users. The system can be used by one or more users. In one aspect, the system is used collaboratively by two users, a learning user and a teaching user. The teaching user is a user that is creating or modifying a story for another user to read or experience. The teaching user can be, for example, a parent, teacher, mentor, supervisor, and the like. The learning user is a user that is reading or experiencing a story that has already been created by a teaching user. The learning user can be, for example, a child or a student. The term "user," alone may refer to either a learning user or a teaching user.

Establishing a profile for a teaching user includes receiving input of information about the teaching user, such as the teaching user's name and email address. Establishing a profile for a learning user includes receiving input of the learning user's name and age. The learning user's profile could also include characteristics such as a favorite color and gender. The learning user's profile may also include an image of the learning user's face. Establishing an account includes recording the user speaking for voice authentication purposes. In some embodiments, a teaching user profile can be associated with one or more learning user profiles using, for example, a relational database table.

Voice authentication can be used to confirm which user is reading a story. The identity of the user reading the story aloud is authenticated by matching the audio input from the user with recorded speech of the user's account. Voice authentication may be performed by an existing service, such as NUANCE or VOICETRUST, which analyzes the unique qualities of an individual's speech and uses those to identify the individual. The recorded speech may be a general sample of the user talking or may be a particular sentence or phrase that the voice authentication system requests. Before interacting with a story, a learning user is selected by entering login information or selecting the user's name or photo, and then prompting the user to speak. The speech is then analyzed to match the previously recorded audio associated with the user's account. This ensures that only the learning user that is logged in can receive credit for reading and completing games associated with a story.

The story analysis module 204 is programmed to dissect stories into components and determine an appropriate audience for the stories. Existing stories are accessed from a story database and analyzed to determine properties of the story such as one or more of the existing audience, language, setting, plot, and characters. The audience is specified by one or more of an age, a gender, and a reading level. Analyzing the stories may include breaking the story's text into parts of speech and plot segments. Analyzing also includes identifying the characters and settings of the story. The story analysis module 204 may also receive input from a user to select an audience for the story.

The multimedia coordination module 206 is programmed to sync story text, animations, background images, sounds, and narrations. The multimedia is coordinated to match the audience, language, setting, plot segments, and characters customized for the story. The narration is coordinated with the story text so that the text is highlighted as the narration reads each word of the text. In some embodiments, the coordination module 206 stores metadata that associates each of the words of the text, animations, and sound effects with a particular time stamp in the sound file for narration. Animations of the characters and the settings are modified and coordinated to match customized text of the story. The multimedia coordination module 206 also coordinates animations, images, and sounds to match the text as a user is reading the story out loud. Multimedia is coordinated by accessing the background images, animations, and audio from databases and combining the files together into a cohesive multimedia presentation of the story If the narration is prerecorded, it may be accessed from a database or from memory 118 of the computing device 102. The prerecorded narration may be recorded by a user or may be obtained from a local or online database.

The multimedia coordination module 206 also plays the multimedia story. The playing may be automatic if the narration is prerecorded. Alternatively, playing of the story may depend on feedback from the learning user. For example, the story may progress as the learning user reads the story out loud. Additionally, there may be prompts such as questions or tasks for the learning user to complete before the story will progress. The teaching user may also read the story out loud to progress the story. In another embodiment, the user can select a "next" button or other indicator to move the story to the next scene and section of text.

The gamification module 208 is programmed to generate reading comprehension questions and provide rewards. Reading comprehension questions are generated by analyzing the text of the customized story to automatically generate reading comprehension questions. Alternatively, a teaching user may input custom made questions into the application. In some embodiments, quizzes, puzzles, and other games are included in addition to reading comprehension questions. The reading comprehension questions are presented to the learning user on the display 110 and/or audio output 112 of the computing device 102. The learning user responds to the questions, puzzles, or games by inputting answers into the device 102. The input could be received through the audio input 114, a touch screen, a keyboard, a mouse, or other input means.

Rewards are provided to the learning user when the learning user is successful in responding to the reading comprehension questions. The rewards may include badges, points, coins, or tokens. In some embodiments, the rewards may be exchanged for prizes in an online store. The prizes may include books, characters, backgrounds, avatar clothing, and other customization options that can be used within the story creation application. Alternatively, the rewards could be exchanged for other types of prizes through an online store or other reward system.

The sharing module 210 is programmed to communicate information to and from other users. The information may be customized stories, analysis reports about a learning user's performance, or other files generated in the software application. A dashboard for viewing customized stories and analysis can be generated. A teaching user can view analyses for multiple learning users through the dashboard. Further, the processor 116 may be programmed to share the dashboard with other teaching users. Sharing may also be done by messaging a particular user and attaching a file. Multimedia files and reports may also be shared by posting on a web page. Sharing may be facilitated by connecting to other users through one or more social networks.

The performance analysis module 212 is programmed to monitor, analyze, and report user performance. Learning users' performance may include pronunciation of words in a story, reading speed, reading comprehension, reading level, and reading volume. As used herein, the term reading volume and variants thereof refers to a numeric measure of the quantity of material read by the user. The performance analysis module 212 may also make recommendations based on the learning user's performance including suggesting new stories to read, noting areas in need of improvement, noting strengths, and noting trends in the learning user's performance. The performance analysis module 212 may also compare the learning user's performance to other learning users of the same age, gender, reading level, etc.

The customization module 214 is programmed to build and customize stories. Input from a teaching user determines one or more of an audience, a language, a setting, a series of plot segments, and one or more characters for the customized story. The audience is specified by an age, a gender, and/or a reading level of the intended learning user. The customized story may be built by accessing an existing story from a story database and editing the story. The existing story may be licensed and subject to royalty fees or it may be a story that is not subject to copyright protection. Alternatively, the story may be built based solely on input from the teaching user. In either method of customized story creation, the software application may provide suggestions to the teaching user when the teaching user is inputting or editing various parts of the story. These suggestions may be made based on an intended audience for the story, which may be automatically selected by the software or is input by the teaching user. The customization module 214 includes a character module 216, a plot module 218, a setting module 220, a language module 222, and a narration module 224.

The character module 216 is programmed to build and customize characters and avatars. One or more characters may be suggested by the character module 216 based on the audience, setting, and plot of the story. The character module 216 receives a selection of one or more characters from the teaching user. The characters may be stock characters, licensed characters, customized avatars, or avatars created with facial recognition software. Facial recognition software may function by analyzing an image of a face and identifying landmarks, or features, of the face. Algorithms may analyze the relative position, size, and shape of eyes, nose, mouth, etc. This analysis is used to generate a three-dimensional graphic representation of the face which can be incorporated into a customized avatar character. The character options may be presented on the display 110 and the teaching user may select one or more of the options presented. The learning user's selection may be received by receiving an input such as a mouse click, a finger gesture on a touch screen, or receiving text input from a keyboard or voice input.

The plot module 218 is programmed to build and customize plots of a story. One or more plot segments for the story may be suggested based on the specified audience, setting, and characters chosen for the story. Plot segments may be displayed for the learning user to view and select one or more options by providing input to the computing device 102. Plot segments may be broken down into introduction/exposition, rising action, climax, falling action, and resolution/ending.

The setting module 220 is programmed to build and customize settings. Settings, or scenes, may be suggested by the setting module 220 based on the specified audience, plots, and character of the story. Potential settings may be displayed in the form of text and/or images for the teaching user to select by providing input to the computing device 102. Settings may include, for example, a city, the woods, the country, an island, and a jungle.

The language module 222 is programmed to modify the language of the story. The language may specify the language that the story is written in, such as English, Spanish, German, etc. Also, the language may be affected by the audience of the story, so that the vocabulary used in the story is appropriate for the age, reading level, and culture of the learning user. The teaching user may specify particular changes to parts of speech of the story to customize the story to a particular audience or learning user.

The narration module 224 is programmed to record and play narrations. The narration module 224 may prompt a teaching user to record narration of a customized story by receiving speech through the audio input 114 of the computing device 102. The narration module 224 can store recorded narrations for later playback. Alternatively, the narration module 224 may access pre-recorded narrations from databases for playback with customized stories.

The exemplary modules of the computing device shown in FIG. 2 can be implemented as one or more software applications. Users interact with the software application on a computer, a tablet, or a smartphone by viewing a graphic user interface and providing input to the computing device through a touchscreen, keyboard inputs, mouse inputs, or other inputs.

Figure 3:
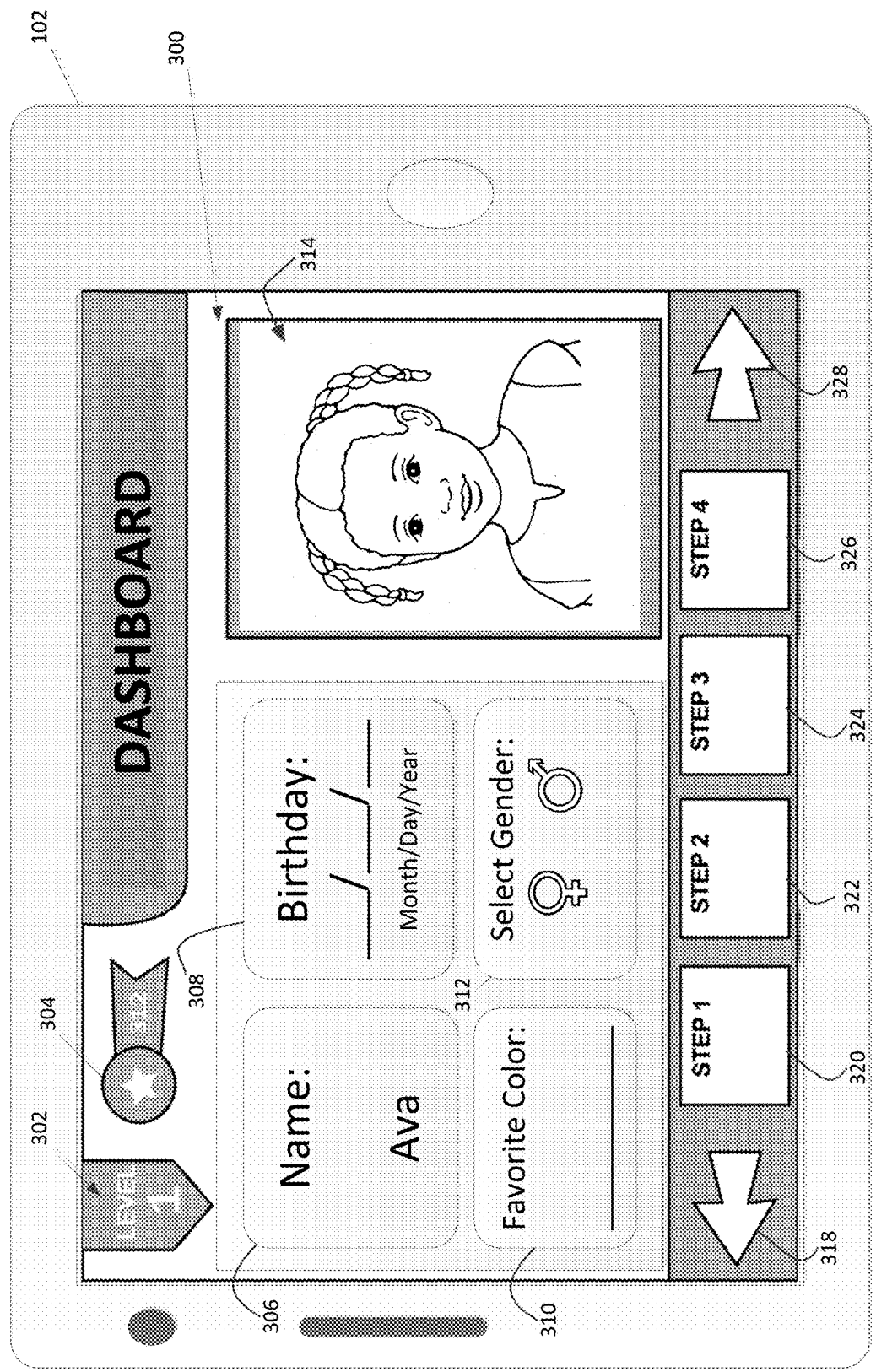
FIG. 3 shows an example display of a user account setup page on the computing device of FIG. 1.

In one example, the software application includes a graphic user interface (GUI) 300, as shown on the display 110 in FIG. 3. The GUI 300 is generated by a computing device 102, like a handheld device (e.g., smartphone or tablet), laptop, desktop, etc. In FIG. 3, the GUI 300 shows an example user account setup page.

User accounts may be set up for a teaching user or a learning user. The GUI 300 shown in FIG. 3 is an example of a learning user account. The user account setup page includes a level indicator 302 and a badge count 304 at the top of the display 110. The level indicator 302 indicates the reading level of the current user. The badge count 304 indicates how many badges the user has earned by reading and playing games using the software application. The name field 306 is used to enter the user's name. A birth date for the learning user is entered into the birthday field 308. A favorite color is entered for the user at the favorite color field 310. The user's gender is identified at the gender selector 312. A user avatar 314 may be selected or created for the user. The user's name 316 is displayed below the avatar 314. At the bottom of the page there are a number of buttons that the user can select to navigate through the GUI 300. These buttons include a back button 318, a step 1 button 320, a step 2 button 322, a step 3 button 324, a step 4 button 326 and a next button 328 for navigating through the story customization process.

Figure 4:
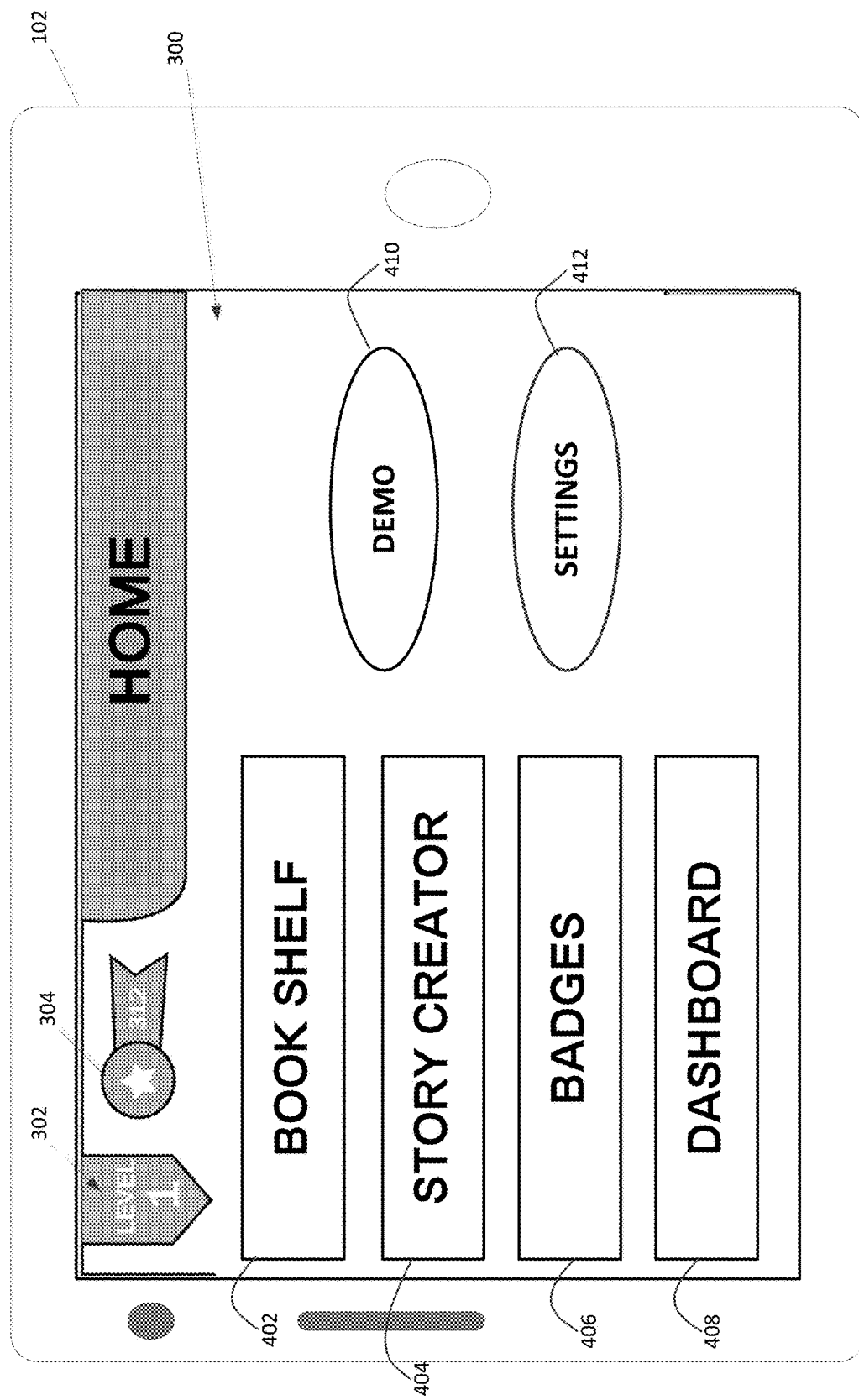
FIG. 4 shows an example display of a home page on the computing device of FIG. 1.

In FIG. 4, the computing device 102 is displaying a home page on the GUI 300. From this page the user can select to navigate to the book shelf 402, the story creator 404, badges 406, or the dashboard 408. The user may also select the demo button 410 to display a demonstration of the software or the settings button 412 to display and change settings for the software.

Figure 5:
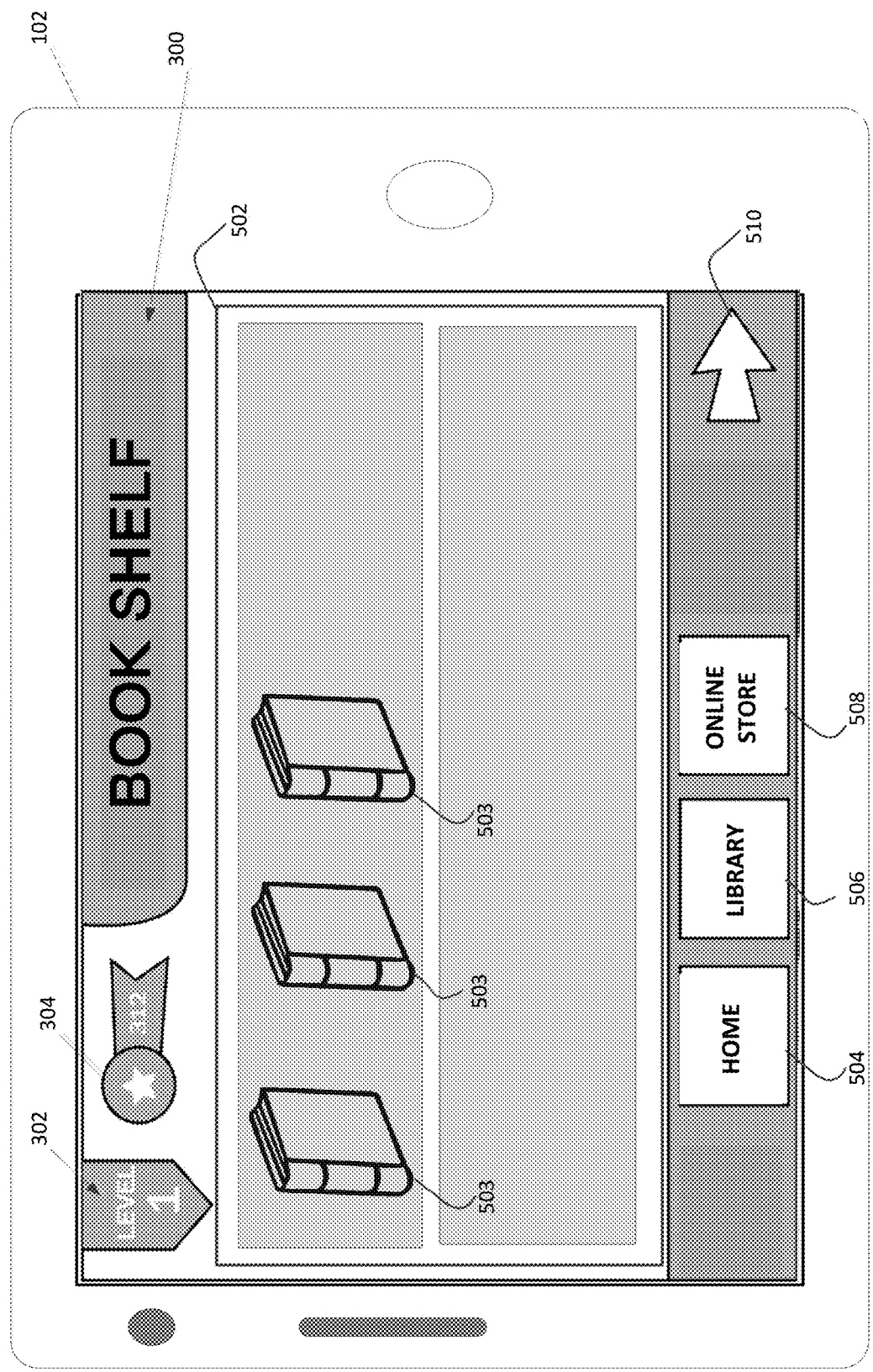
FIG. 5 shows an example display of a book shelf page on the computing device of FIG. 1.
Figure 7:
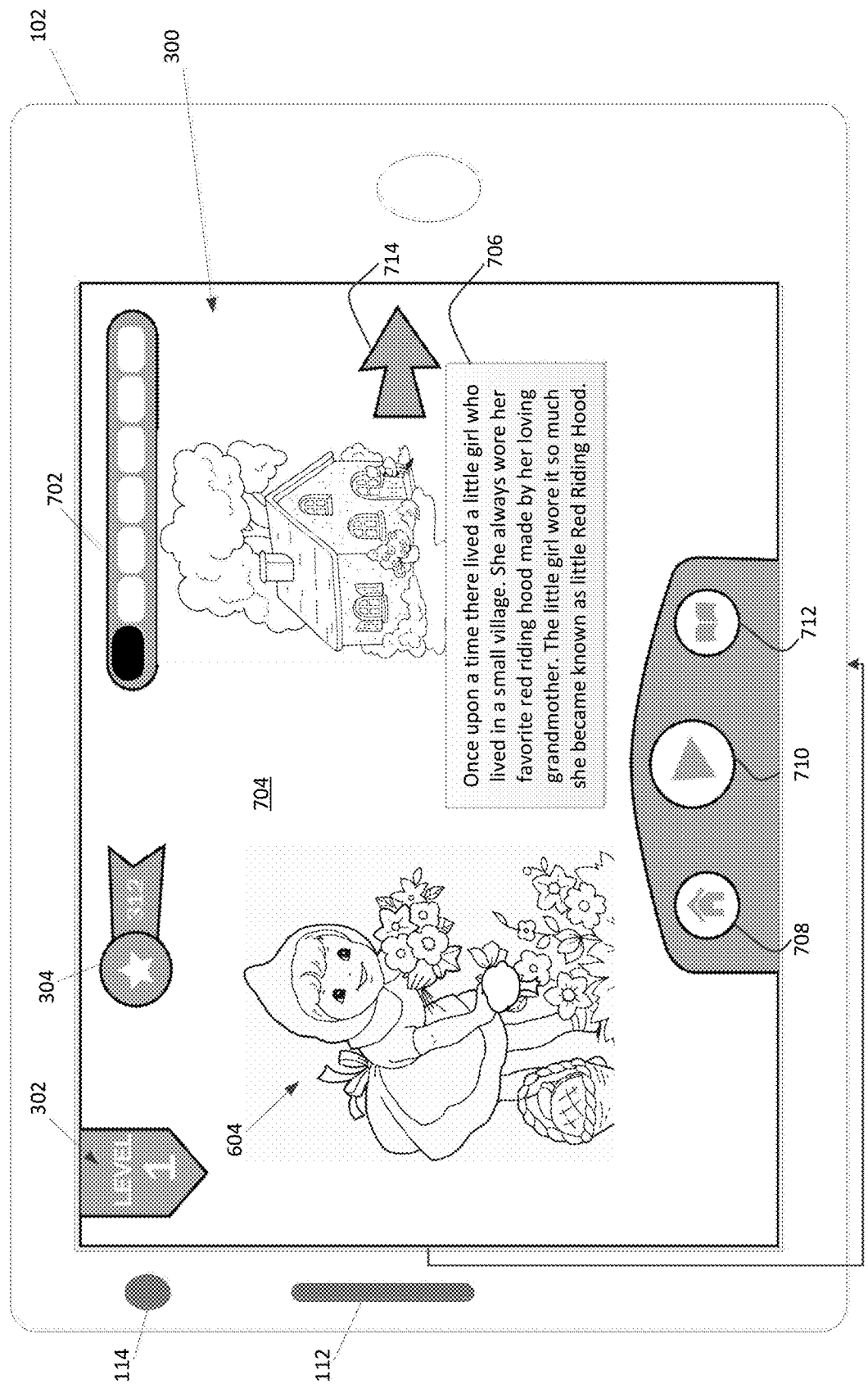
FIG. 7 shows an example display of an interactive multimedia story on the computing device of FIG. 1.
Figure 8:
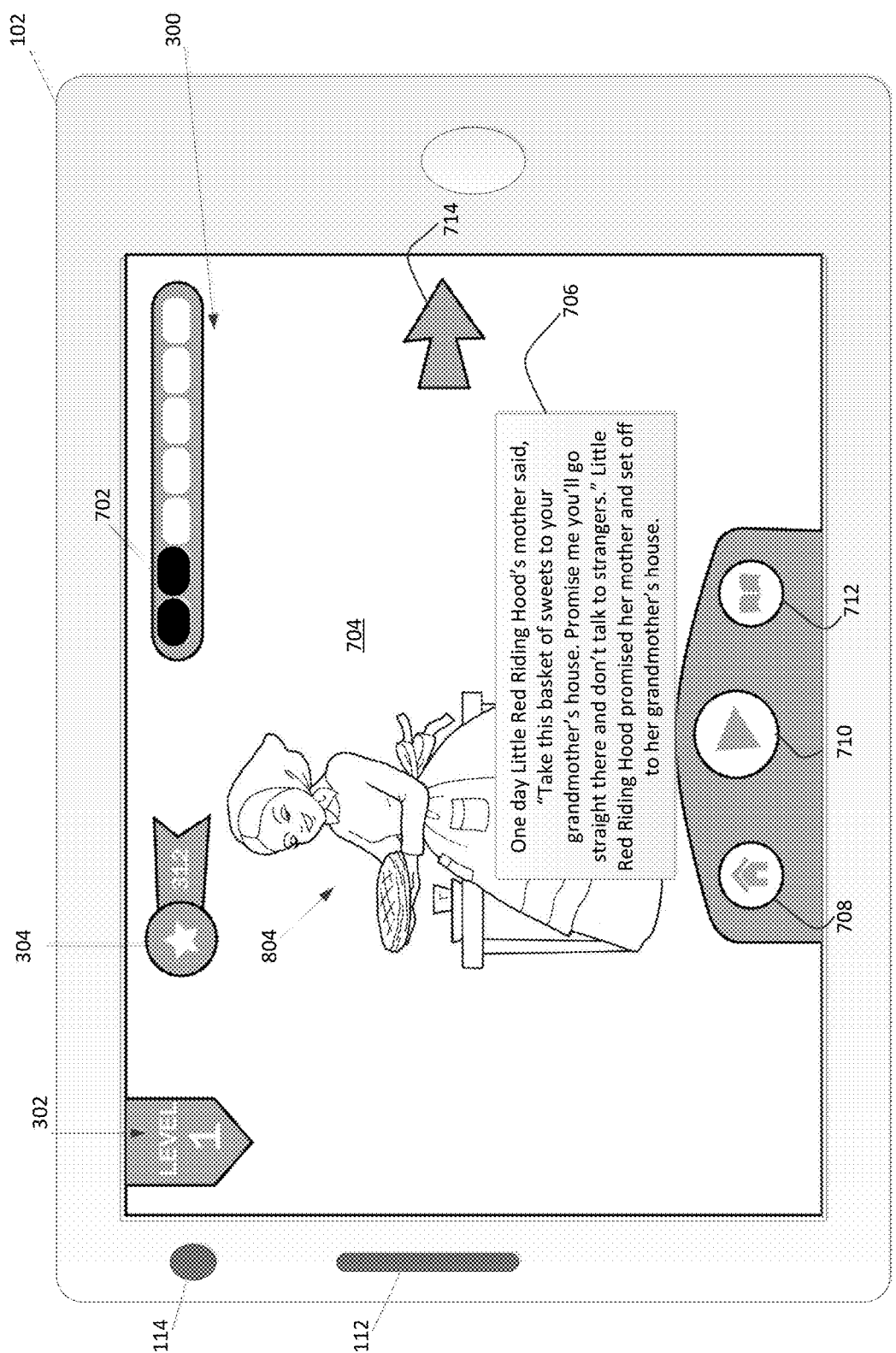
FIG. 8 shows another example display of the interactive multimedia story of FIG. 7.

If the user selects the book shelf 402 option in FIG. 4, the book shelf page will be displayed as shown, for example, in FIG. 5. A virtual book shelf 502 is displayed with one or more books 503 that the user can select. By selecting the home button 504, the user will return to the previous home page, as shown in FIG. 4. By selecting the library button 506, the user will navigate to a library page to view other books that are available. By selecting the online store button 508, the user will navigate to an online store where the user can purchase additional books or stories. If the user has more than one book shelf 502, the user can navigate to additional book shelves by selecting the next button 510. If the user selects a book 503, the GUI 300 will display a multimedia version of the book, as shown in FIGS. 6-8.

Figure 6:
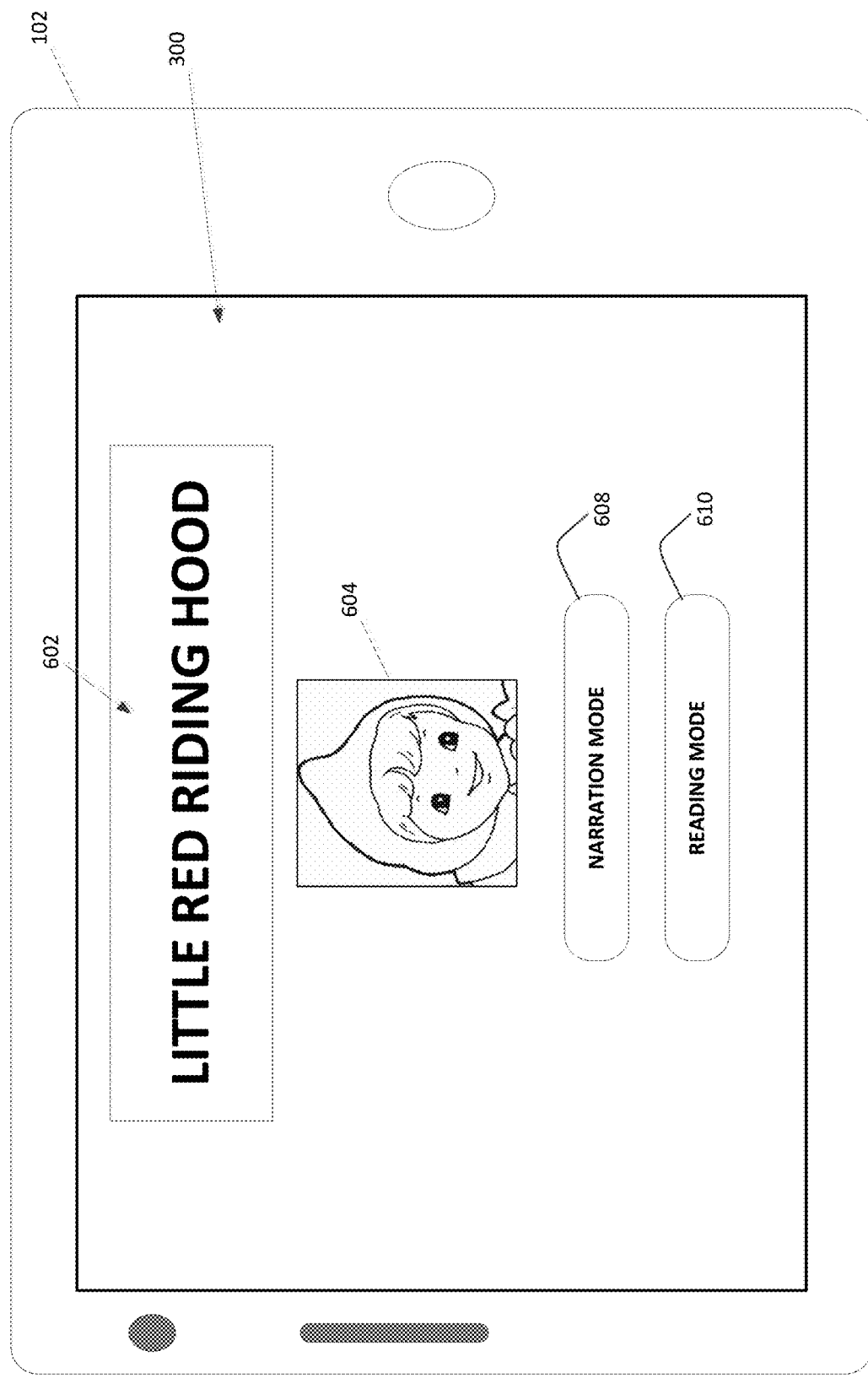
FIG. 6 shows an example display of the title page of a book on the computing device of FIG. 1.

FIG. 6 shows a display of the title page of a book on the GUI 300. The title 602 of the book, "Little Red Riding Hood," is displayed at the top of the display. The main character 604 is highlighted on the display. The user may select the "Narration Mode" button 608 to have the story read to the user. Alternatively, the user may select the "Reading Mode" button 610 if the user wants to read the story him/herself.

Once the user has selected either the "Narration Mode" button 608 or the "Reading Mode" button 610, the multimedia story is played on the computing device 102. An example of a beginning of a story is shown in FIG. 7. A progress bar 702 is displayed at the top of the page, indicating how far the user has progressed through the story. The setting 704 of the story is portrayed in a background image or animation. The character 604, Little Red Riding Hood, is shown within the setting 704. The character 604 may be animated to match the text 706 of the story. The GUI 300 includes a home button 708 that the user may select to return to the home screen. The play button 710 will activate one or more effects including narration of that page, playing music, playing animations, or recording the user reading when selected. The bookshelf button 712 returns the user to the bookshelf 502 when selected.

If the story is in "Narration Mode," the text of the story is narrated by producing audio through an audio output 112 of the computing device 102. The word that is currently being narrated may be highlighted to help the learning user follow along in the text of the story. Alternatively, the user may listen to the narration through headphones or other audio outputs. If the story is in "Reading Mode," the learning user reads the text. The software may prompt the learning user to read the story aloud. Voice authentication may be used to confirm the identity of a user reading the story aloud by recording the user's voice through an audio input 114 of the computing device 102.

The story continues in FIG. 8. The setting 802 has changed and a new character 804 is introduced. The progress bar 702 indicates that the user has moved further in the story. New text 706 is presented to match the scene. To progress in the story, the user may select the next button 714. Additional screens will be shown in a similar manner to finish the story.

Figure 9:
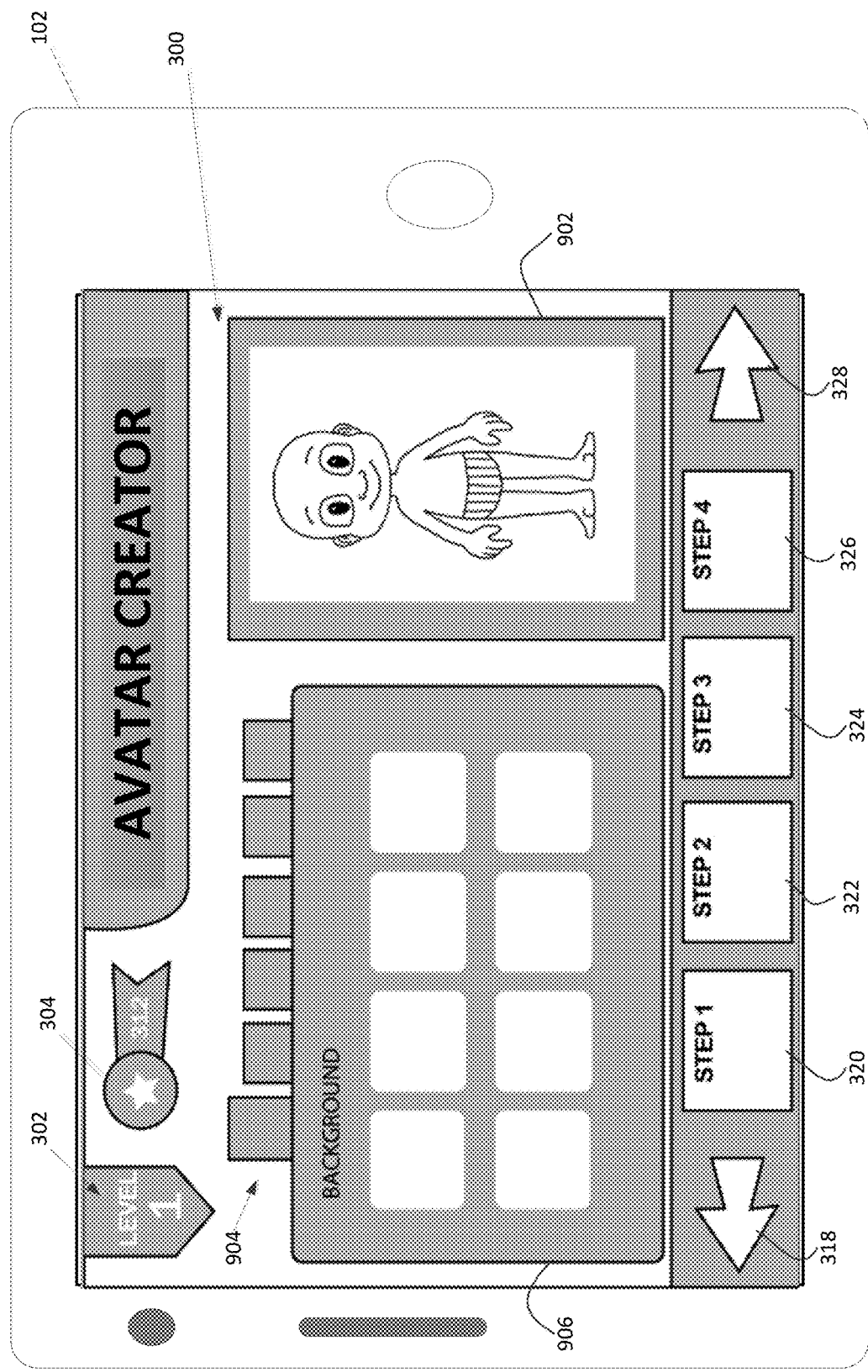
FIG. 9 shows an example display of an avatar creator page on the computing device of FIG. 1.

Referring back to FIG. 4, if a user selects the story creator button 404, the GUI 300 will navigate to pages for customizing or creating a multimedia story. For example, in FIG. 9, an avatar creator page is displayed. The avatar 902 is shown on the right in a default state. A user can customize the avatar 902 by choosing from the customization options tabs 904 and selecting one or more custom features 906 for the avatar 902 to have. In some embodiments, the avatar 902 may be generated from a photograph or image captured of a user's face. Facial recognition software is utilized to generate an avatar's features based on the photograph or image.

Figure 10:
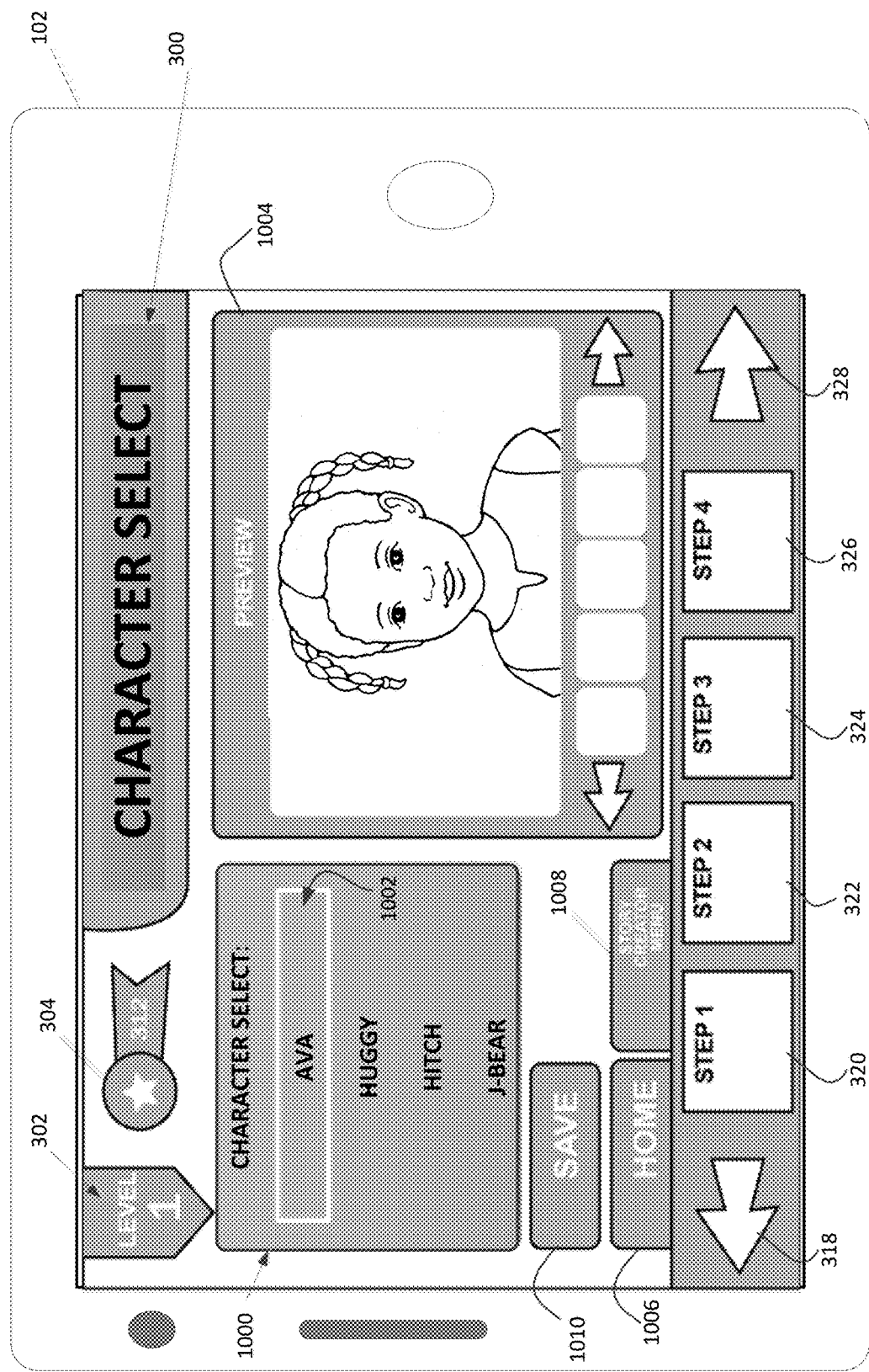
FIG. 10 shows an example display of a character selection page on the computing device of FIG. 1.

FIG. 10 shows a display of the GUI 300 for selecting one or more characters for the story. The user can select from one or more characters 1000. The characters may include an avatar created by the user, or stock characters provided by the software. In some embodiments, the characters are licensed, for example, from Disney or Nickelodeon®. The selected character 1002, Ava, is shown in the preview 1004. The user can return to the home screen or to the story creator menu by selecting the home button 1006 or story creator menu button 1008. There is also a save button 1010 to save the story.

Figure 11:
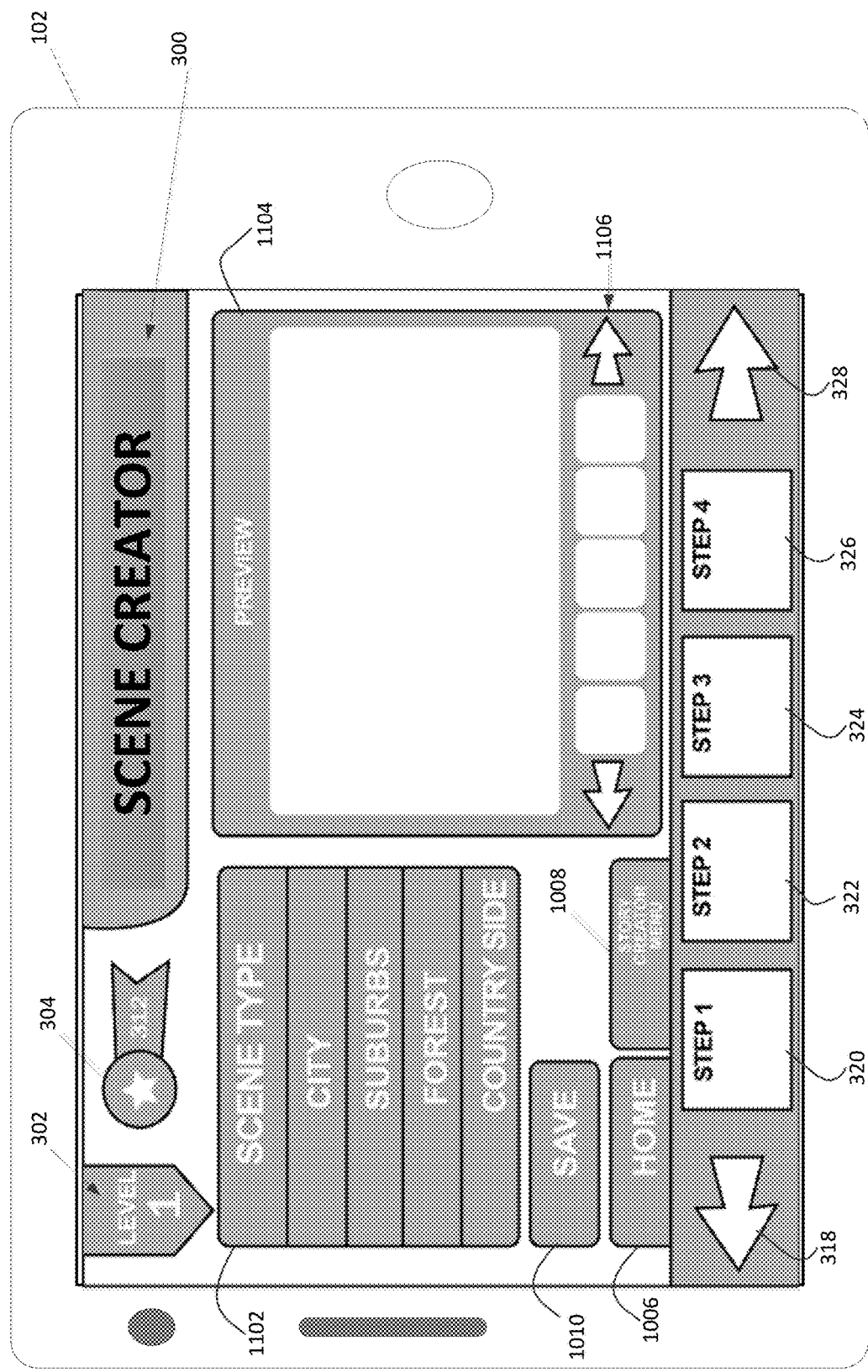
FIG. 11 shows an example display of a scene creator page on the computing device of FIG. 1.

FIG. 11 shows a scene creator page on the computing device 102. The user can select a scene type with the scene type selector 1102 and then preview the scene in the preview window 1104 and toggle through variations of the scene with the toggle arrows 1106. The user can save the story by selecting the save button 1108. The user may also use the home button 1006 or story creator menu button 1008 to return to previous pages.

Figure 12:
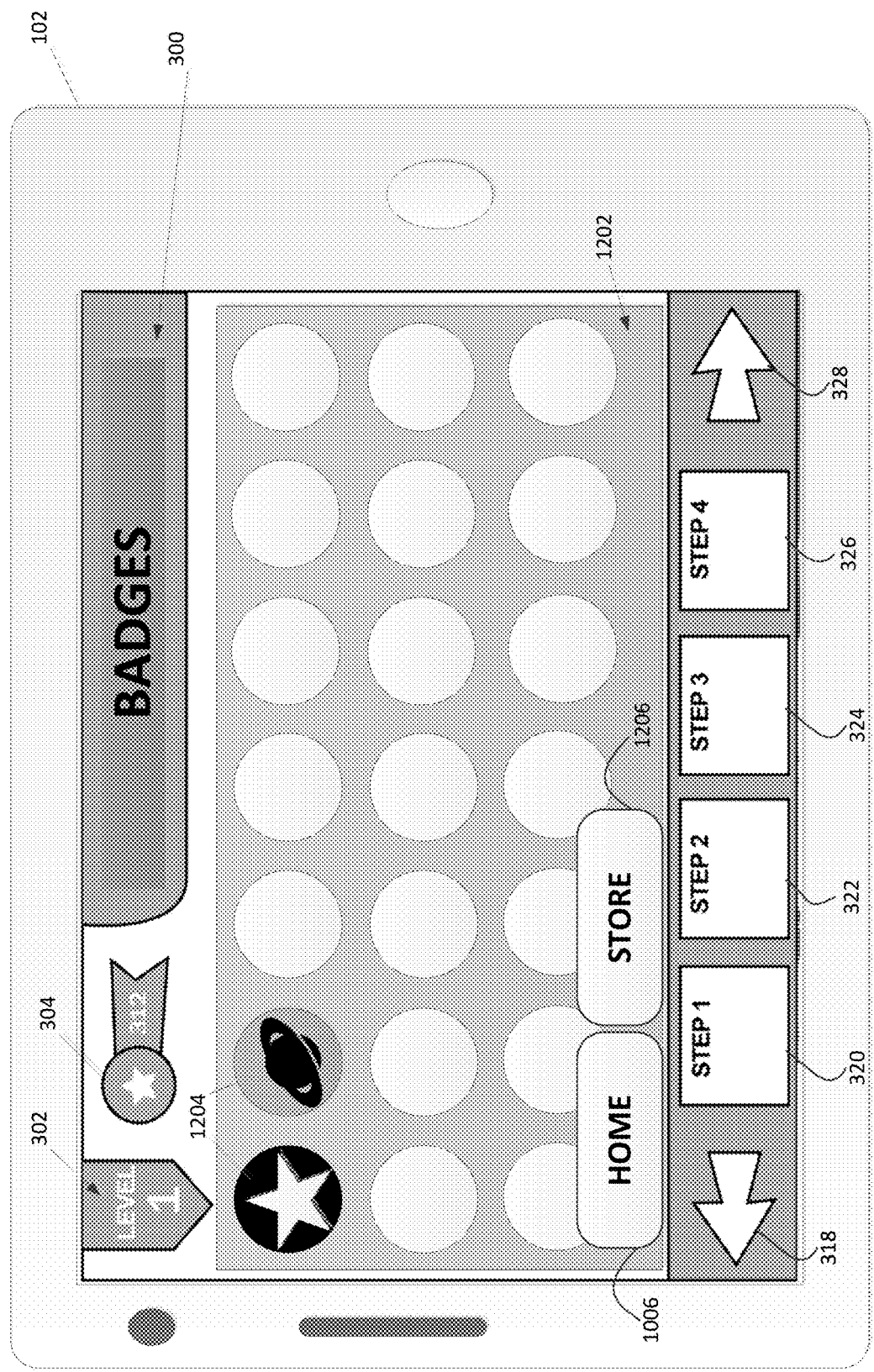
FIG. 12 shows an example display of a badge page on the computing device of FIG. 1.

FIG. 12 shows a display of the GUI 300 that is shown when the user selects the badges button 406 of FIG. 4. The badge display area 1202 is shown in the center holding two badges 1204. Navigation arrows 318, 328 allow the user to browse through badges 1204 that the user has earned. Selecting the home button 1006 will navigate back to the home screen. If the user selects the store button 1206, the user will be taken to an online store where the user can exchange badges for rewards.

Figure 13:
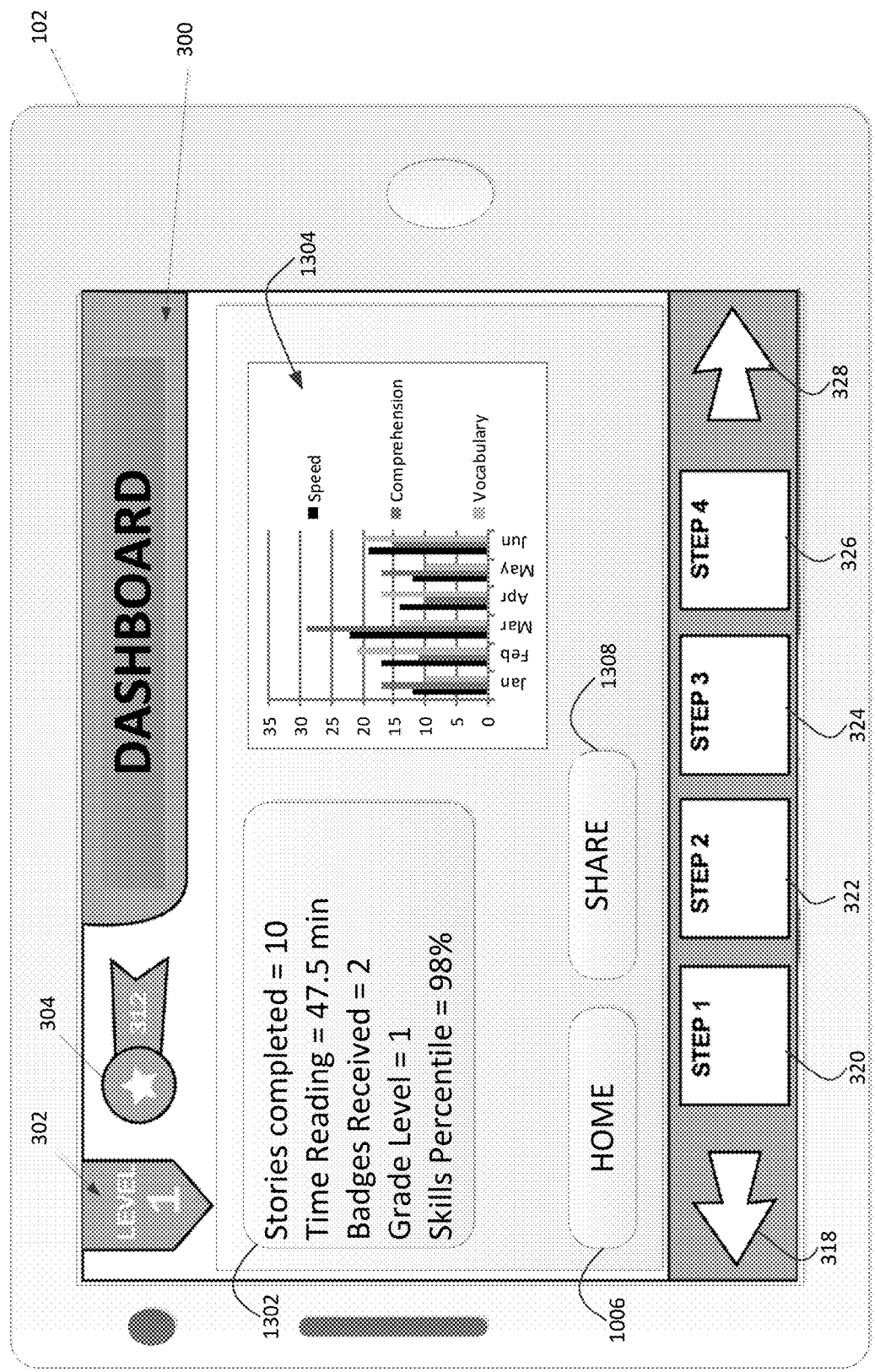
FIG. 13 shows an example display of a dashboard on the computing device of FIG. 1.

Upon selecting the dashboard button 408 in the display of FIG. 4, the GUI 300 will display a dashboard 1300 as shown in FIG. 13. The statistics indicator 1302 shows various statistics and numerical values for the learning user's performance including the number of stories completed, the amount of time the user has spent reading, the number of badges received, the learning user's grade level, and the user's skills percentile. The dashboard 1300 includes a performance chart 1304 which shows the learning user's performance in reading speed, reading comprehension, and vocabulary. From the dashboard, the user may return to the home page by selecting the home button 1006. The information in the dashboard 1300 may be shared with other users by selecting the share button 1308.

Figure 14:
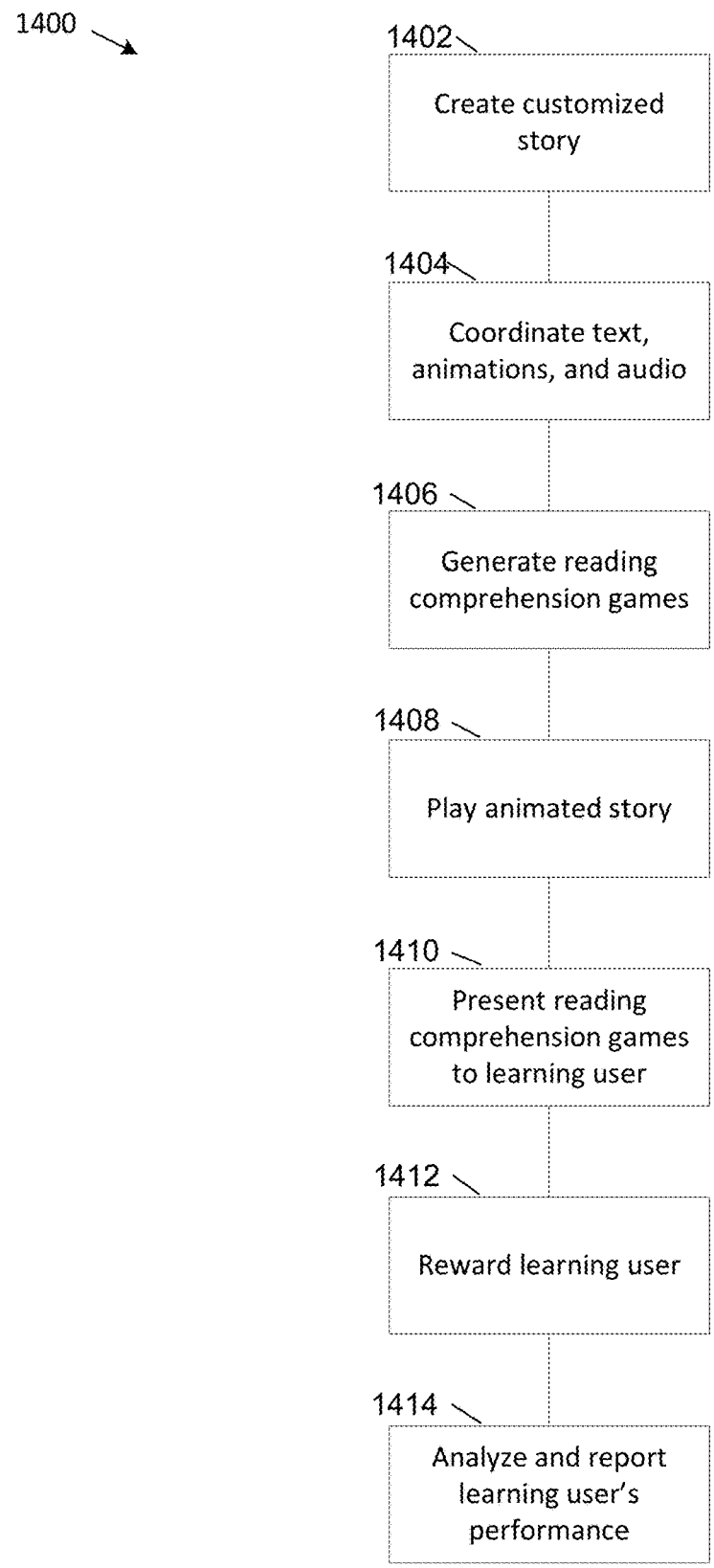
FIG. 14 shows a flowchart for an example method of teaching literacy with customized stories implemented on a computing device.

FIG. 14 shows a flowchart of a method 1400 implemented on a computing device, such as the computing device 102, for teaching literacy with customized stories.

At operation 1402, a customized story is created based on input from a teaching user. The input can determine an audience, a language, a setting, a series of plot segments, and characters for the customized story.

If the teaching user is customizing an existing story, the existing story is accessed from a story database and analyzed to determine the existing audience, language, setting, plot, and characters. The teaching user may provide input to change the audience for the story. The application may then suggest one or more alternatives to the existing language, setting, plot, and characters based on the chosen audience for the story. The teaching user selects from the alternatives or enters original alternatives to the existing language, setting, plot, and characters to produce a customized story.

Alternatively, if the teaching user is creating a customized story "from scratch," the user provides input specifying an audience for the story. The software application then suggests one or more settings for the story based on the specified audience. The teaching user selects a setting for the story. The application then suggests one or more plot segments for the story based on the specified audience and setting and the teaching user selects one or more plot segments for the story. Based on the specified audience, setting, and plot segments, one or more characters are suggested for the story. The teaching user then selects one or more characters for the story. Regardless of the method of story creation, the teaching user may then record narration of the customized story.

At operation 1404, text, animations, and audio are coordinated to match the determined audience, language, setting, plot segments, and characters. The story's text may be generated or modified to match the selections and customizations specified by the teaching user. Text, animations, and audio are accessed from databases and combined together to produce a cohesive multimedia presentation of the customized story.

At operation 1406, reading comprehension games are generated based on the customized story. The games may be generated automatically by analyzing the text of a customized story. Alternatively, the teaching user can produce original, customized reading comprehension games or questions for the learning user. Appropriate rewards for completing the games are determined.

At operation 1408, the animated story is played through the display 110 and audio output 112 of the electronic computing device 102. This may include pre-recorded narration synchronized with the text, animations, and audio of the customized story. Playing the animated story may include receiving audio input from the learning user reading the story aloud.

The identity of the learning user may be confirmed with voice recognition, comparing the learning user's reading out loud with a pre-recorded audio file from the learning user's profile. The identity of the learning user may be confirmed to properly attribute analytics and rewards to the learning user. The playback of text, animations, and audio of the customized story is synchronized with the audio input from the learning user. The learning user's pronunciation and reading speed may be recorded and analyzed during playback. In some embodiments, feedback regarding pronunciation and other performance regarding the learning user's reading may be provided to the learning user during playback.

At operation 1410, the reading comprehension games are presented to the learning user. The reading comprehension games and/or questions may be presented on the display 110 and/or audio output 112 of the computing device 102. The learning user may respond to the games and/or questions by providing input through the audio input 114, the display 110, or other input means on the computing device 102.

At operation 1412, the learning user is rewarded based on the learning user's performance in the reading comprehension games. The rewards may include badges, points, coins, etc. The rewards may be exchanged for prizes in an online store. The prizes may include books, avatar clothing, new characters, etc.

At operation 1414, the learning user's performance is analyzed and reported to the learning user and/or teaching user. The learning user's performance includes pronunciation of words in the story, reading speed, reading comprehension, estimated reading level, and reading volume or amount. Recommendations may be made based on the learning user's performance, including new stories to read, areas that need improvement, strengths, and trends in the learning user's reading level, reading comprehension, etc.

Customized stories and analyses may be saved in one or more databases. Users may access the stories and analyses at a later time through the software application. Stories and analyses may also be shared with other users. Customized stickers, coloring book pages, and other printable materials may be created and produced based on customized stories and characters.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Figure 15:
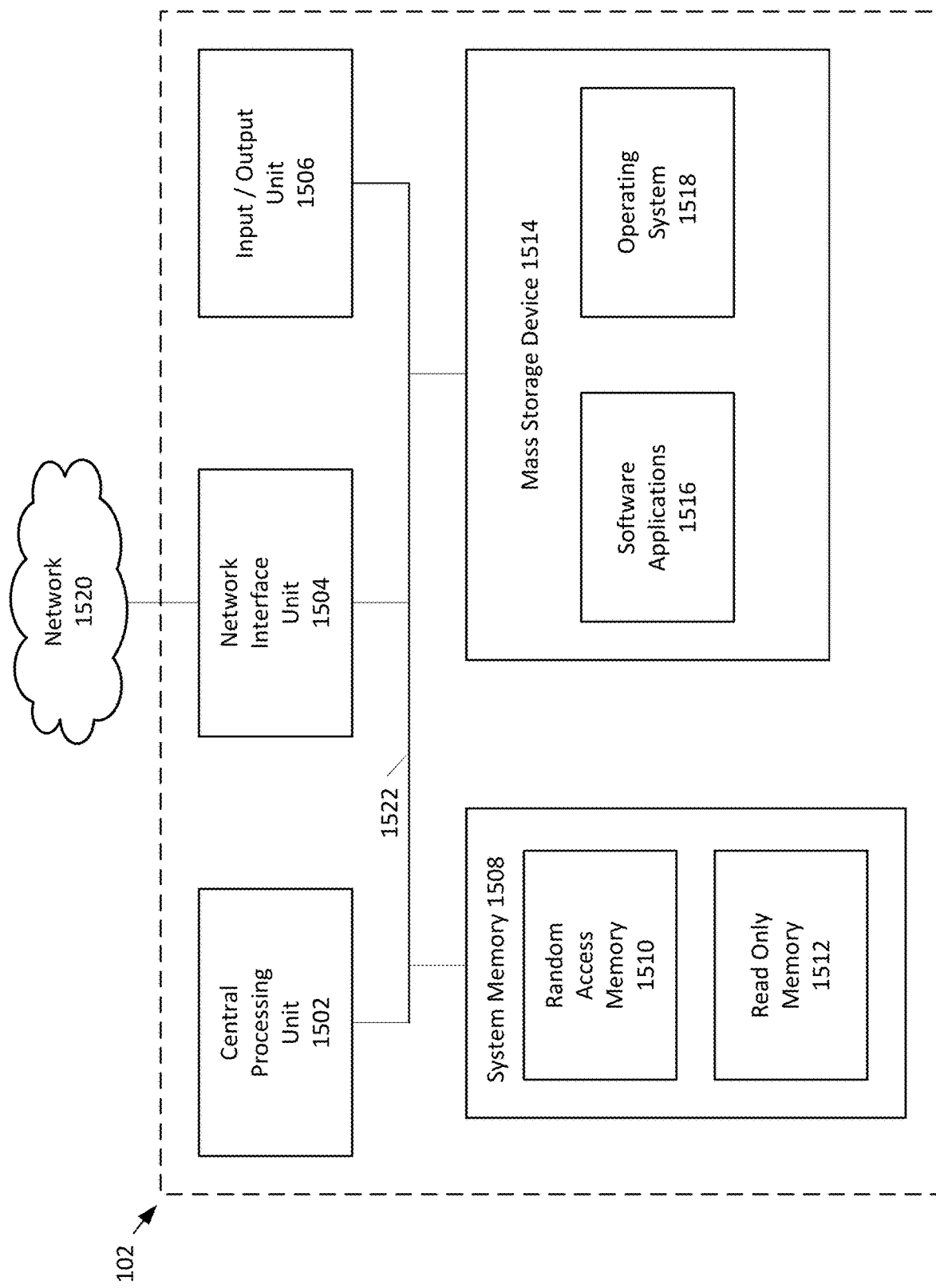
FIG. 15 shows example physical components of the computing device of FIG. 1.

As illustrated in the example of FIG. 15, the computing device 102 includes at least one central processing unit ("CPU") 1502, a system memory 1508, and a system bus 1522 that couples the system memory 1508 to the CPU 1502. The system memory 1508 includes a random access memory ("RAM") 1510 and a read-only memory ("ROM") 1512. A basic input/output system that contains the basic routines that help to transfer information between elements within the computing device 102, such as during startup, is stored in the ROM 1512. The computing device 102 further includes a mass storage device 1514. The mass storage device 1514 is able to store software instructions and data. A central processing unit, system memory and mass storage device similar to that in FIG. 15 are also included in the server computer 106.

The mass storage device 1514 is connected to the CPU 1502 through a mass storage controller (not shown) connected to the system bus 1522. The mass storage device 1514 and its associated computer-readable data storage media provide non-volatile, non-transitory storage for the computing device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 102.

According to various embodiments of the invention, the computing device 102 may operate in a networked environment using logical connections to remote network devices through the network 104, such as a wireless network, the Internet, or another type of network. The computing device 102 may connect to the network 104 through a network interface unit 1504 connected to the system bus 1522. It should be appreciated that the network interface unit 1504 may also be utilized to connect to other types of networks and remote computing systems. The computing device 102 also includes an input/output controller 1506 for receiving and processing input from a number of other devices, including a touch user interface display screen, or another type of input device. Similarly, the input/output controller 1506 may provide output to a touch user interface display screen or other type of output device.

As mentioned briefly above, the mass storage device 1514 and the RAM 1510 of the computing device 102 can store software instructions and data. The software instructions include an operating system 1518 suitable for controlling the operation of the computing device 102. The mass storage device 1514 and/or the RAM 1510 also store software instructions, that when executed by the CPU 1502, cause the computing device 102 to provide the functionality of the computing device 102 discussed in this document. For example, the mass storage device 1514 and/or the RAM 1510 can store software instructions that, when executed by the CPU 1502, cause the computing device 102 to display received financial data on the display screen of the computing device 102.

Although various embodiments are described herein, those of ordinary skill in the art will understand that many modifications may be made thereto within the scope of the present disclosure. Accordingly, it is not intended that the scope of the disclosure in any way be limited by the examples provided.

I claim:

1. A literacy teaching method implemented on an electronic computing device, the method comprising:
    establishing one or more accounts for one or more teaching users and learning users, wherein the account includes a recording of the user speaking for voice authentication;
    receiving input from a teaching user specifying an audience and a language, where the audience is defined by at least an age, reading level, and culture;
    receiving input from the teaching user, the input determining one or more of a setting, a series of plot segments, and one or more characters;
    generating customized story based on the input from the teaching user, where the vocabulary used in the customized story is appropriate for the specified audience; and
    automatically analyzing the customized story to generate reading comprehension games and coordinate the customized story text with animations and audio to match the determined audience, language, setting, plot segments, and characters to produce a multimedia presentation of the customized story.

2. The method of claim 1, further comprising:
    playing the multimedia presentation of the customized story through a display and audio output of the electronic computing device;

presenting the reading comprehension games to a learning user;

rewarding the learning user based on the learning user's performance in the reading comprehension games; and analyzing and reporting the learning user's performance.

3. The method of claim 1, wherein the customized story is created by:

analyzing an existing story accessed from a story database to determine the existing audience, language, setting, plot, and characters;

receiving input from the teaching user to change the audience for the story;

suggesting one or more alternatives to the existing language, setting, plot, and characters based on the audience; and receiving input from the teaching user to select one or more alternatives to the existing language, setting, plot, and characters.

4. The method of claim 1, wherein the customized story is created by:

determining the age, reading level, and culture of the audience for the story;

suggesting one or more settings for the story based on the specified audience;

receiving a selection of a setting from the teaching user;

suggesting one or more plot segments for the story based on the specified audience and setting;

receiving a selection of one or more plot segments from the teaching user;

suggesting one or more characters for the story based on the specified audience, setting, and plot segments;

receiving a selection of one or more characters from the teaching user.

5. The method of claim 1, wherein the characters comprise stock characters, licensed characters, customized avatars, and avatars created by facial recognition software.

6. The method of claim 5, wherein the characters comprise at least one three-dimensional avatar created using facial recognition software, the avatar representing a user.

7. The method of claim 1, further comprising recording narration of the customized story.

8. The method of claim 1, wherein playing the customized story through a display and one or more speakers of the electronic computing device comprises playing pre-recorded narration synchronized with the text, animations, and audio of the customized story.

9. The method of claim 1, wherein playing the customized story through a display and one or more speakers of the electronic computing device comprises receiving audio input from the learning user reading the story aloud, confirming the identity of the learning user with voice recognition, and synchronizing playback of the text, animations, and audio of the customized story with the audio input from the learning user.

10. The method of claim 9, wherein confirming the identity of the learning user comprises comparing the learning user's reading out loud with a pre-recorded audio file from the learning user's profile.

11. The method of claim 1, wherein rewarding the learning user's responses to the reading comprehension games comprises awarding badges, points, coins, or tokens that can be exchanged for prizes in an online store.

12. The method of claim 1, wherein analyzing and reporting the learning user's performance comprises analyzing one or more of the learning user's pronunciation of words in the story, reading speed, reading comprehension, estimated reading level, and reading volume.

13. One or more non-transitory computer-readable media having computer-executable instructions embodied thereon that, when executed by one or more computing devices, cause the device to:

establish an account for a teaching user by receiving input of the teaching user's name and recording speech of the teaching user for voice authentication;

establish an account for a learning user by receiving input of the learning user's name and age and recording speech of the learning user for voice authentication;

create a customized story based on input from the teaching user, wherein the input determines an audience and one or more of a setting, a series of plots segments, and one or more characters for the customized story, wherein the audience is specified by one or more of an age, a gender, and a reading level;

coordinate text, animations, and audio to match the determined audience, setting, plot segments, and characters;

automatically generate reading comprehension games based on the customized story;

receive login information for the learning user, prompt the learning user to speak, and compare to the previously recorded speech to confirm the identity of the learning user;

play the customized, animated story through a display and one or more speakers of the electronic computing device;

receive audio input from a learning user or a teaching user reading the story aloud;

authenticate the identity of the learning user or the teaching user reading the story aloud by matching the audio input with recorded speech of the user's account and analyzing the unique qualities of the audio input;

present the reading comprehension games to the learning user;

reward the learning user with badges, points, coins, or tokens based on the learning user's responses to the reading comprehension games; and analyze and report the learning user's performance on one or more of reading comprehension, pronunciation, reading speed, estimated reading level, and reading volume.

14. The computer-readable media of claim 13, wherein the customized story is created by dissecting an existing story into components; determining an appropriate audience for the story; suggesting alternative audiences, settings, plot segments, and characters for the story; and receiving input from the teaching user to select one or more of the alternatives.

15. The computer-readable media of claim 14, wherein the components of the existing story include parts of speech and the teaching user selects alternatives to parts of speech within the story text.

16. The computer-readable media of claim 13, wherein the customized story is created by receiving input from the teaching user specifying an audience for the story; suggesting one or more settings, plot segments, and characters based on the specified audience; receiving a selection of one or more of the settings, plot segments, and characters from the teaching user; and receiving input from the teaching user to generate text for the story.

17. The computer-readable media of claim 13, wherein the instructions further cause the processor to make recommendations based on the learning user's performance including suggesting new stories to read, noting areas in need of improvement, noting strengths, and noting trends in the learning user's performance.

18. The computer-readable media of claim 13, wherein the instructions further cause the processor to share the customized story and analysis report by generating a dashboard for viewing customized stories and analysis in which the teaching user can view analyses for multiple learning users.

19. A system programmed to customize gamified multimedia stories, the system comprising:
- a processor;
- a display;
- an audio input device;
- an audio output device; and
- system memory encoding instructions that, when executed by the processor, create:
  - a user account module programmed to build user profiles and authenticate users, wherein authentication is performed using at least voice authentication;
  - a story analysis module programmed to dissect stories into components and determine an appropriate audience for the stories;
  - a multimedia coordination module programmed to sync story text, animations, background images, sounds, and narrations;
  - a gamification module programmed to generate reading comprehension questions and provide rewards;
  - a sharing module programmed to connect with other users;
  - a performance analysis module programmed to monitor, analyze, and report user performance;
  - a customization module comprising:
    - a character module programmed to build and customize characters and avatars;
    - a plot module programmed to build and customize plots of a story;
    - a setting module programmed to build and customize settings;
    - a language module programmed to modify the language of the story and determine vocabulary appropriate for the age, reading level, culture, and language of a learning user; and
    - a narration module programmed to record and play narrations.

* * * * *